United States Patent
Higashiura et al.

(10) Patent No.: US 7,660,992 B2
(45) Date of Patent: Feb. 9, 2010

(54) ELECTRONIC DATA STORAGE SYSTEM AND METHOD THEREOF

(75) Inventors: Yasuyuki Higashiura, Inagi (JP); Takumi Kishino, Inagi (JP); Keizo Sato, Inagi (JP); Shoki Kadowaki, Inagi (JP); Seigo Kotani, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 692 days.

(21) Appl. No.: 10/767,842

(22) Filed: Jan. 30, 2004

(65) Prior Publication Data

US 2004/0250071 A1 Dec. 9, 2004

(30) Foreign Application Priority Data

Feb. 3, 2003 (JP) ............................. 2003-25462

(51) Int. Cl.
*H04L 9/32* (2006.01)
(52) U.S. Cl. ...................................... 713/176; 713/179
(58) Field of Classification Search ....................... None
See application file for complete search history.

(56) References Cited

U.S. PATENT DOCUMENTS 5,748,738 A * 5/1998 Bisbee et al. ................ 713/176
6,950,943 B1 * 9/2005 Bacha et al. .................. 726/21

FOREIGN PATENT DOCUMENTS

| JP | 10-268764 | 10/1998 |
| JP | 2000-59353 | 2/2000 |
| JP | 2000-285026 | 10/2000 |

* cited by examiner

*Primary Examiner*—Jung Kim
(74) *Attorney, Agent, or Firm*—Kratz, Quintos & Hanson, LLP

(57) ABSTRACT

An electronic data storage system stores electronic data with attaching an electronic signature, and output the electronic data along with the attached electronic signature, which decreases the operation costs with a simple operation. By using a public key-based signature, a third party can verify the data, and by using a secret check code, the electronic signature at registration is always valid without risk of falsification. Also by attaching an electronic signature at access, the validity of the stored data is assured, and a third party can verify the data. By using all of these features, the verification by a third party becomes possible over the long term. In this way the long term storage of electronic data is implemented.

15 Claims, 14 Drawing Sheets

FIG. 12

| ITEM | 2001 YEAR | 2002 YEAR | 2003 YEAR | |
|---|---|---|---|---|
| SIGNATURE KEY | P-K | Q-K | R-K | |
| STORING FORM OF DOCUMENT (A) | A <br> P C(P) | | | |
| OUTPUT FORM OF DOCUMENT (A) | A P | A P Q | A P R | |

ELECTRONIC DATA STORAGE SYSTEM AND METHOD THEREOF

CROSS-REFERENCE TO RELATED APPLICATIONS

This application is based upon and claims the benefit of priority from the prior Japanese Patent Application No. 2003-025462, filed on Feb. 3, 2003, the entire contents of which are incorporated herein by reference.

BACKGROUND OF THE INVENTION

1. Field of the Invention

The present invention relates to an electronic data storage system and a method thereof for distributing various documents and data as electronic information, and more particularly to an electronic data storage system and a method thereof for assuring original validity for a storage of an electronic data which can be easily falsified or of which falsification cannot be discovered.

2. Description of the Related Art

Currently as various systems are computerized, paper-based data is also becoming computerized. Computerized data can be easily falsified, and in some cases falsification cannot easily be discovered. Therefore to store electronic data, original validity is demanded for electronic data to be as valid as the original.

For this, it is effective to have a falsification detection function and to record the entire access history when storing electronic data, and generally the original validity of the stored data is assured using a public key-based electronic signature so that verification of a third party is possible.

Along with the recent advancements in computer technology and the spread of its knowledge, the potential of the falsification of electronic signatures has been noted, and a method of assuring the original validity of electronic data over the long term using a long term storage technology for electronic signatures has been proposed.

FIG. 13 is a diagram depicting a first prior art. The electronic data storage system 100 stores the registered electronic data A with adding a public key-based electronic signature. In the case of the known RSA encryption system, for example, a pair of a public key and a secret key is created, and the public key is brought to the CA (Certification Authority) office (station) 110 on-line or off-line using a floppy disk, etc., and the public key certificate 106 is acquired from the CA office 110.

The electronic data storage system 100 which received the public key certificate RSA-encrypts the hash value of the electronic data A to be registered using a private key, and creates the electronic signature P. This electronic signature P is stored along with the electronic data A. The public key is disclosed to the individual for whom access to the electronic data A is approved. The electronic signature encrypted by the secret key can be decoded with the public key, and a third party can confirm the original validity of the electronic data using the electronic signature.

This public key certificate has a period of validity, so a new public key is created before the period of validity expires, and a new public key certificate is acquired by using that key, and the electronic data and the electronic signature P are encrypted using the secret key to create a new electronic signature P1.

Normally the period of validity of the public key certificate is about one year, so by attaching a new electronic signature to the electronic signature every year, the dangers surrounding a signature key are prevented and original validity is assured, so as to implement the long term storage of electronic data (e.g. Japanese Patent Application Laid-Open No. 2000-59532).

FIG. 14 is a diagram depicting a second prior art. Just like FIG. 13, the public key certificate 106 is received from the CA office 110, and the electronic data A is stored with the signature P attached. Also the electronic data and the hash value of the data of the electronic signature are sent to TSA (Time Stamp Authority) 112, and the time stamp is acquired as a notarized record. This time stamp T is stored along with the electronic data A and the electronic signature P. By this, the long term storage of electronic data is implemented.

However, in the case of the first prior art, a signature is stored over a long term by attaching an electronic signature to the electronic signature every year, so the new electronic signature must be attached to all the stored electronic data each time the signature key is changed. Therefore this method takes too much time for a storage system which stores a large volume of electronic data, which causes operation problems, and in practical terms makes processing difficult.

In the case of the second prior art, the TSA 112 is outside the system, and it is the TSA 112 which is responsible for long term assurance. And this incurs additional costs since the TSA 112 is run by a third party organization. For example, the cost is xxx Yen per electronic document or xxx thousand Yen per year, which increases operation costs.

SUMMARY OF THE INVENTION

With the foregoing in view, it is an object of the present invention to provide an electronic data storage system and a method thereof for implementing the long term storage of an electronic signature with a simple operation, without generating new costs.

It is still another object of the present invention to provide an electronic data storage system and a method thereof for verifying an electronic signature by a public key certificate, which has a period of validity because of the safety of an encryption key, even after the period of validation or after expiration.

It is still another object of the present invention to provide an electronic data storage system and a method thereof for assuring that the electronic signature has not been falsified by having a falsification detection mechanism which is separate from the electronic signature, based on a safe falsification detection method which is safer and is not disclosed the system/key, so that the electronic signature becomes valid over the long term.

It is still another object of the present invention to provide an electronic data storage system and a method thereof for enabling a third party to verify the electronic data and the signature at registration, which are assured within the electronic data storage system by attaching the electronic signature at the point of accessing when the electronic data is accessed, so that alteration of the electronic data, which occurs in the output route after the storage system, can be detected.

It is still another object of the present invention to provide an electronic data storage system and a method thereof for storing or outputting the public key certificate and the expiration information created at the point when the signature is attached, at the timing when the electronic signature is attached, so that a third party can verify the electronic signature and can verify the validity of the electronic document even after the period of validity expires.

To achieve these objects, the electronic storage system of the present invention has a file device for storing at least electronic data, and a data processing unit which generates check codes for detecting falsification respectively for the electronic data and a public key-based electronic signature using a secret encryption method and/or an encryption key when electronic data is registered, stores the electronic data, the public key-based electronic signature and the respective check codes, verifies the respective validity of the stored electronic data and the electronic signature using the check codes attached there to when the electronic data is output, then accesses the electronic data and the electronic signature.

The electronic data storage method of the present invention has a step of respectively generating check codes for detecting falsification for the electronic data and the public key-based electronic signature using a secret encryption method and/or an encryption key when the electronic data is registered, and storing the electronic data, the public key-based electronic signature and the respective check codes, and a step of verifying the respective validity of the stored electronic data and the electronic signature using the check codes attached thereto when the electronic data is output, then accessing the electronic data and the electronic signature.

In the present invention, check codes, based on a secret method and a key unique to the system, are assigned to the electronic data and the electronic signature within the electronic data storage system, and are checked when the electronic document is accessed, so falsification of the electronic data and the electronic signature can be checked, that is, the validity of the electronic data and the electronic signature can be confirmed, and the electronic signature can be assured over the long term.

Also the present invention has a file device for storing at least electronic data, and a data processing unit which generates a check code for detecting falsification for one of the electronic data and the public key-based electronic signature using a secret encryption method and/or an encryption key when the electronic data is registered, stores the electronic data, the public key-based electronic signature, and the falsification check code for the electronic signature, and validates the electronic data using the electronic signature after verifying the validity of the electronic signature using the check code attached to the electronic signature when the electronic data is accessed, then accesses the electronic data and the electronic signature.

In the present invention, the validity of the electronic data and the electronic signature is secured by the original check even after the period of validity of the public key certificate is expired, and a third party can verify the validity of the electronic data and the electronic signature at registration.

In the present invention, it is preferable that the data processing unit outputs the electronic data and the electronic signature with attaching the public key-based electronic signature created at the point of access to at least one of the electronic data and the electronic signature at registration after verifying the validity of the electronic data and the electronic signature. In this way, the electronic signature at registration and the electronic signature created at access are output along with the electronic data, so a third party can check falsification (validity check) using the valid signature key. Also falsification can be checked using the electronic signature at registration, and these falsification checks can be used depending on the case.

Also in the present invention, it is preferable that the data processing unit stores a certificate of the public key with which the electronic signature was created, simultaneously along with the electronic signature, when the electronic signature is created.

In the present invention, it is preferable that the data processing unit stores and outputs the expiration information of the public key certificate simultaneously with the data.

In the present invention, it is preferable that the data processing unit creates a pair of a public key and a secret key according to the request for the key creation, issues the request of issuing the public key certificate to a CA office, acquires the public key certificate, and stores it in the file device.

BRIEF DESCRIPTION OF THE DRAWINGS

FIG. 12 is a diagram depicting the operation of the processing in FIG. 11;

DESCRIPTION OF THE PREFERRED EMBODIMENTS

Embodiments of the present invention will now be described in the sequence of the electronic data storage system, storage and access processing of the electronic data, and other embodiments, however the present invention is not limited to the following embodiments.

[Electronic Data Storage System]

Figure 1:
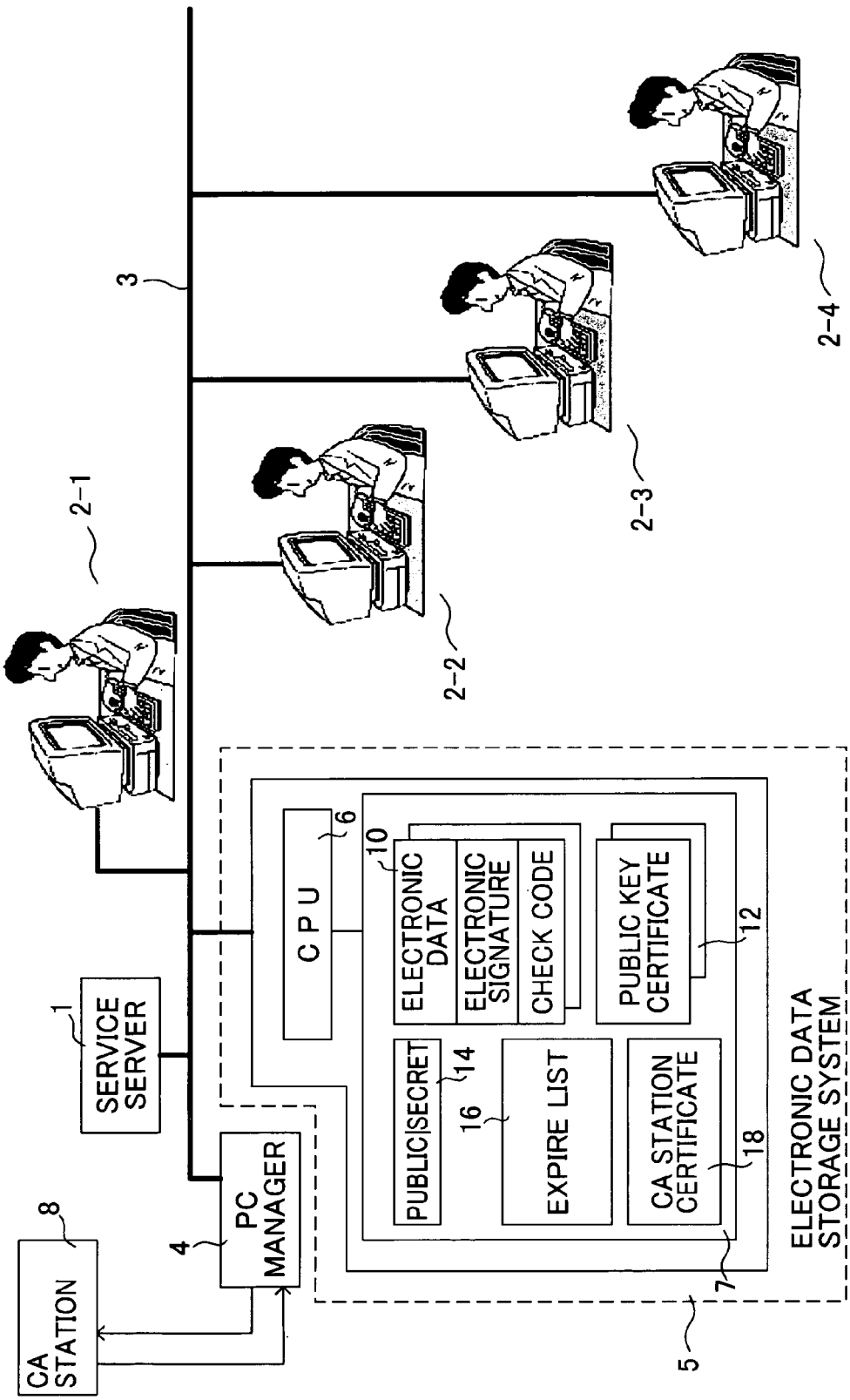
FIG. 1 is a diagram depicting a configuration of an electronic data storage system according to an embodiment of the present invention.

FIG. 1 is a diagram depicting the electronic storage system according to an embodiment of the present invention. As FIG. 1 shows, a plurality of clients (PC: personal computers) 2-1 to 2-4 perform processing, such as document creation. The plurality of clients 2-1 to 2-4 are connected to the service server 1 via the LAN (Local Area Network) 3, and request data storage and data access.

The electronic data storage system 5 and the management client 4 thereof are connected to the LAN 3. The electronic data storage system 5 is comprised of the file device 7 for storing the electronic data, and the CPU 6 (Central Processor Unit) for controlling the files. The file device 7 is comprised of a single or a plurality of hard disk devices according to the required data storage capacity. The file device 7 may be comprised of other storage devices, such as an optical disk device or a magneto-optical disk device.

The management client 4 is for managing the electronic data, and requests the public key certificate 12 to the CA (Certification Authority) office 8. In the file device 7, the electronic data, the electronic signature and the check code 10 are stored in the electronic document unit. Also in the file device 7, the acquired public key certificate 12, the generated pair of the public key and the secret key 14, the expiration list of the public key certificate 16 and the CA office certificate 18 are stored.

The clients 2-1 to 2-4 request the service server 1 to store the electronic data to the electronic data storage system 5, and requests to access the electronic data. The management client 4 can also request to the service server 1, just like the other clients 2-1 to 2-4.

The management client 4 connects with the CA office 8 by on-line or off-line, and acquires the public key certificate. In the present invention, the electronic data storage system 5 has a falsification detection mechanism which is separate from the electronic signature, based on a safer falsification method which is not disclosed the system/key, so it is assumed that the electronic signature has not been falsified, which makes the electronic signature valid over the long term.

[Storage and Access Processing of Electronic Data]

Figure 2:
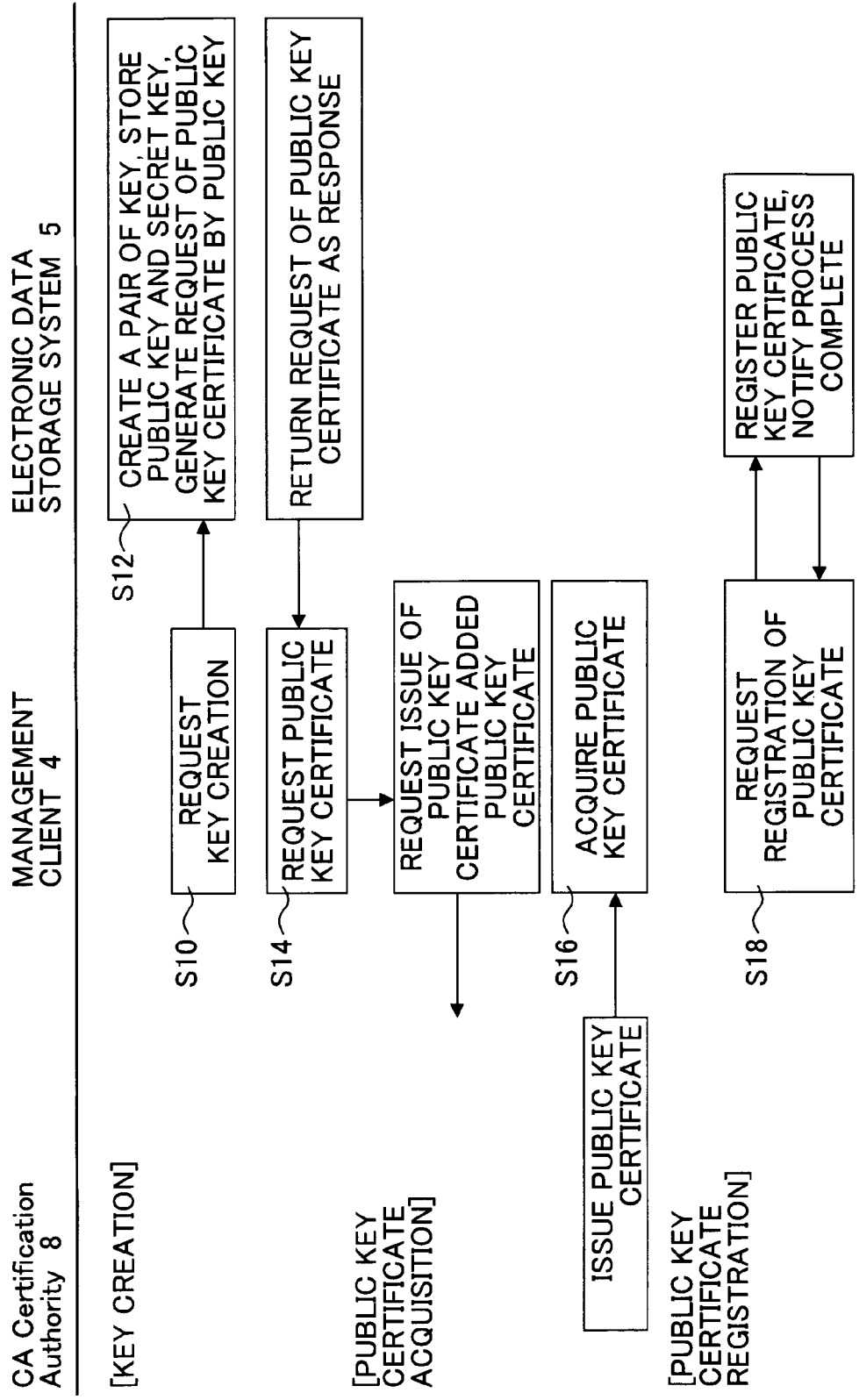
FIG. 2 is a flow chart depicting the public key certificate acquisition processing in FIG. 1.

The storage and access processing of the electronic data in the configuration in FIG. 1 will now be described. At first, the public key certificate acquisition processing will be described with reference to the diagram in FIG. 4 according to the processing flow chart in FIG. 2.

(S10) At first, the management client 4 requests the electronic data storage system 5 to create a key.

(S12) The electronic data storage system 5 creates a signature key (a key pair of the public key and the secret key) 14. And this signature key 14 is stored in the file device 7. Then the electronic data storage system 5 creates the public key certificate request using the public key, and returns the public key certificate request to the management client 4 as a response.

(S14) The management client 4 receives the public key certificate request created in the electronic data storage system 5, and requests the CA office 8 to issue the public key certificate with attaching the public key certificate request.

(S16) The CA office 8 issues the public key certificate from the issue request which is brought in, and the management client 4 acquires this public key certificate 12.

(S18) The management client 4 requests the electronic data storage system 5 to register the public key certificate. The electronic data storage system 5 stores this public key certificate 12 in the file device 7. And the electronic data storage system 5 reports the completion of the processing to the management client 4. By this, the public key certificate acquisition processing ends.

Figure 3:
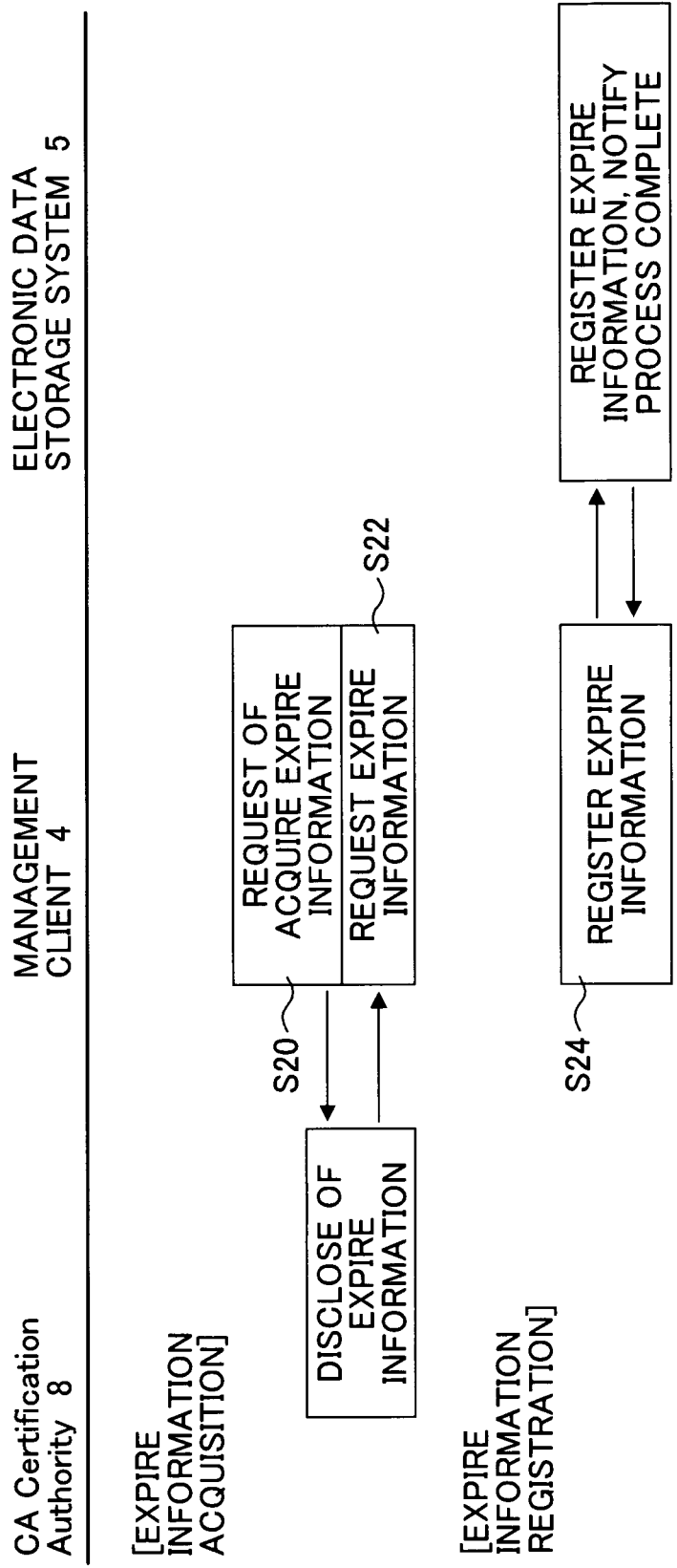
FIG. 3 is a diagram depicting the public key certificate acquisition processing in FIG. 1.
Figure 4:
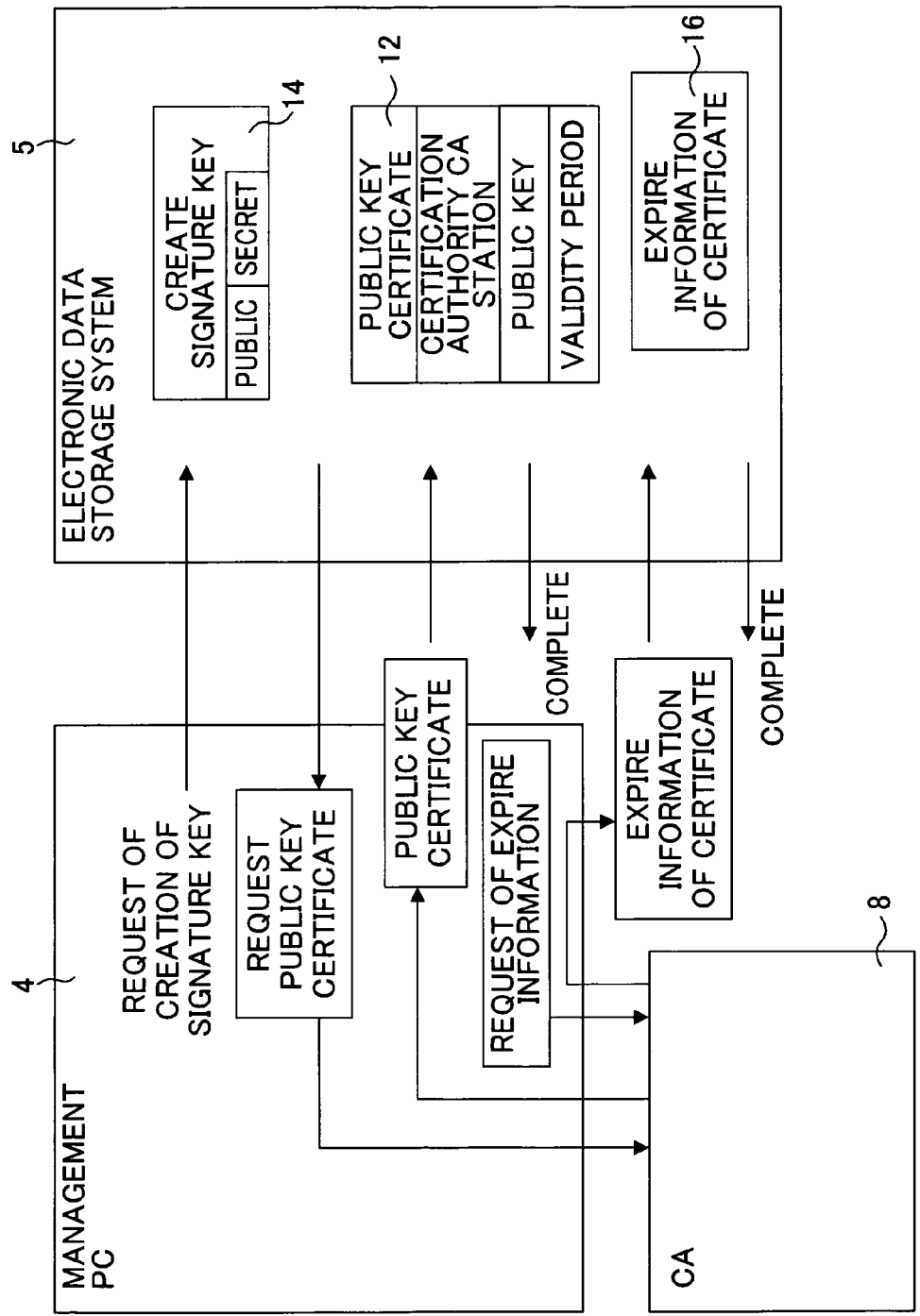
FIG. 4 is a flow chart depicting the public key expiration information acquisition processing in FIG. 1.

Now the expiration information acquisition and the registration processing will be described with reference to FIG. 4, according to the processing flow chart in FIG. 3.

(S20) The management client 4 regularly requests to acquire the expiration information from the CA office 8 (depending on the next expiration information providing period written in the certificate expiration information).

(S22) The CA office 8 discloses the expiration information to the management client 4 according to the expiration information acquisition request, and the management client 4 acquires this expiration information 16.

(S24) The management client 4 requests the electronic data storage system 5 to register the expiration information, and the electronic data storage system 5 registers this expiration information 16 in the file device 4. And the expiration information acquisition and the registration processing ends. To create an electronic signature, the latest expiration information is checked in order to confirm that the certificate has not expired.

Figure 5:
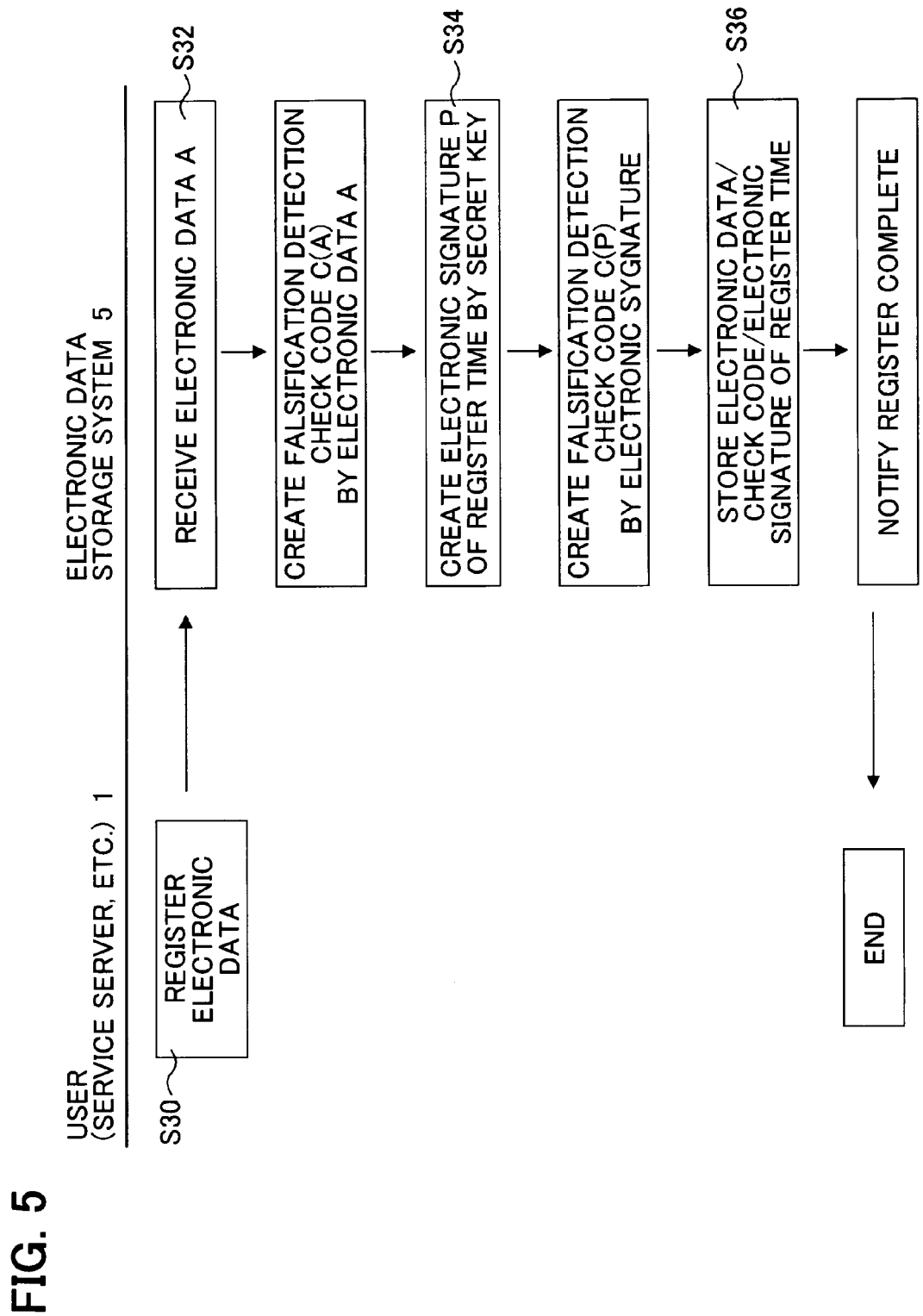
FIG. 5 is a flow chart depicting the document registration processing in FIG. 1.
Figure 6:
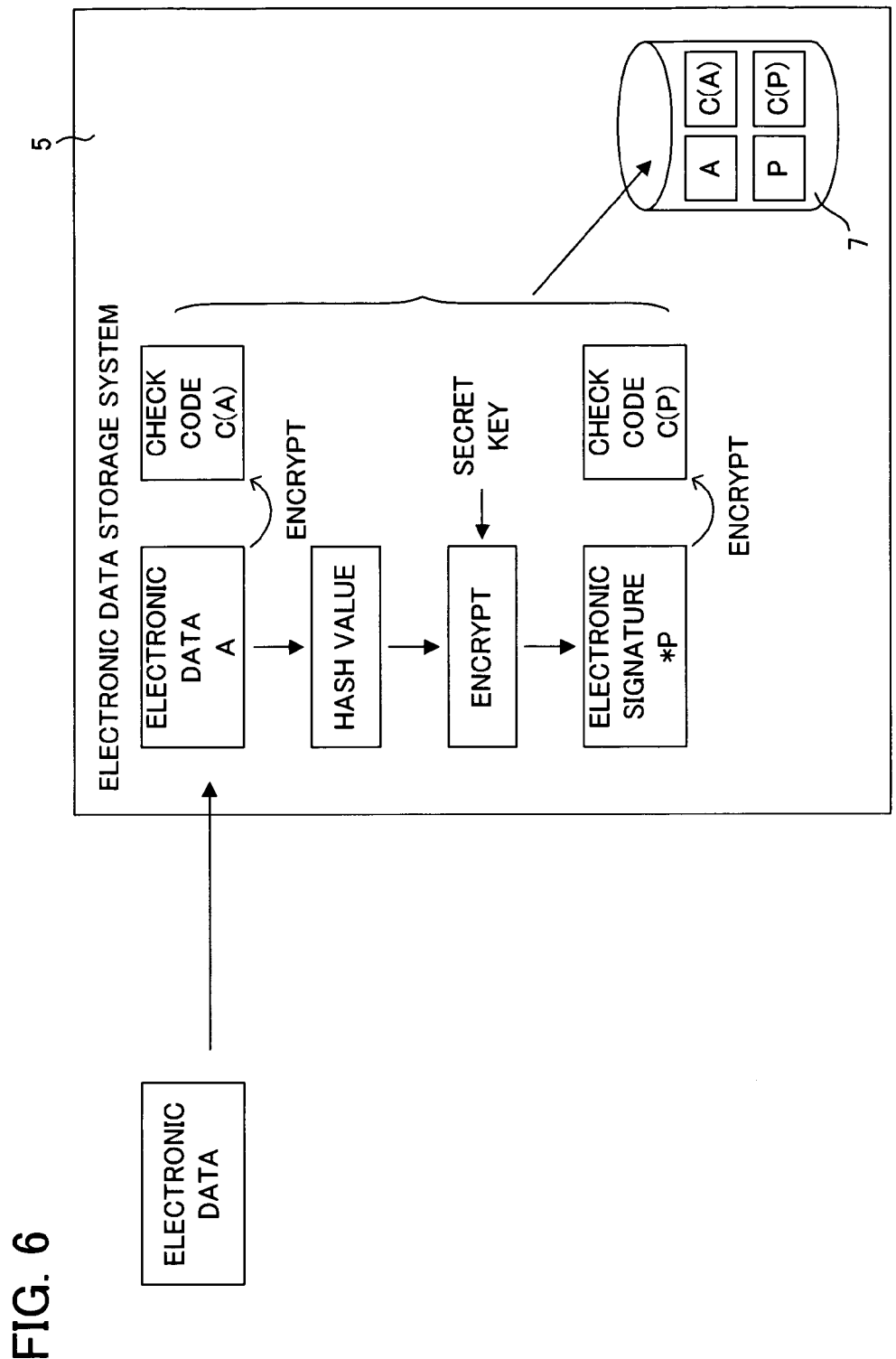
FIG. 6 is a diagram depicting the operation of the document registration processing in FIG. 5.

Now the document registration processing will be described with reference to the diagram of the document registration processing in FIG. 6, according to the flow chart of the document registration processing in FIG. 5.

(S30) The clients 2-1 to 2-4 issue an electronic data registration request to the electronic data storage system 5 via the service server 1.

(S32) The electronic storage system 5 receives the electronic data A, and creates the falsification detection check code C (A) by an encryption algorithm unique to the system from the hash value of the electronic data A.

(S34) The hash value of the electronic data A is RSA-encrypted using a secret key so as to create the electronic signature at registration P. And the falsification detection check code C (P) is created by an encryption algorithm unique to the system from the hash value of the electronic signature P.

(S36) The electronic data storage system 5 attaches the electronic signature at registration to the electronic data, and attaches the check code to the respective data, and stores the electronic data in the file device 7. Then the electronic data storage system 5 notifies the registration completion to the service server 1. By this, the document registration processing ends.

Now the document access processing will be described with reference to the diagram depicting the document access processing in FIG. 8, according to the flow chart of the document access processing in FIG. 7.

(S40) The clients 2-1 to 2-4 issue the electronic data access request to the electronic data storage system 5 directly or via the service server 1.

(S42) The electronic data storage system 5 retrieves the electronic data A of the file device 7.

(S44) The electronic data storage system 5 verifies the electronic data A and the electronic signature P by the respective falsification detection check codes C (A) and C (P). In other words, just as described above, the falsification detection check code C (A) is created by an encryption algorithm unique to the system using the hash value of the retrieved electronic data A, and compares this check code C (A) with the stored falsification detection check code C (A). Also the falsification detection check code C (P) is created by an encryption algorithm unique to the system using the hash value of the retrieved electronic signature P at registration, and compares this check code C (P) with the stored falsification detection check code C (P).

(S46) If the verification result is good, the electronic data storage system 5 RSA-encrypts the hash value of the electronic data A using the secret key of the public key certificate which is valid at the time of access, and creates the electronic signature P' at access.

(S48) The electronic data storage system 5 attaches the electronic signature at registration P and the electronic signature at access P' to the electronic data A, outputs them to the requested service server 1 and clients 2-1 to 2-4, and ends the processing. If the verification result is not good, falsification may have occurred, so the electronic data storage system 5 notifies that output is disabled.

The third party who accessed the electronic data decodes the electronic signature at access using the public key, and verifies the possibility of falsification.

Figure 9:
FIG. 9 is a diagram depicting the document access operation in FIG. 8.

FIG. 9 is a diagram depicting this operation. This shows an example when a valid signature key was changed as PK, QK and RK sequentially each year in 2001, 2002 and 2003, and that document A was registered in 2001, and the electronic signature at registration P and the respective check codes C (A) and C (P) were stored.

In this example, the check codes C (A) and C (P), which are secret and unique to the system, are attached and checked when the electronic document is assessed within the electronic storage system 5, so falsification of the electronic data and the electronic signature, that is the validity of the electronic data and the electronic signature, can be confirmed within the electronic data storage system.

Also when the document is accessed, the electronic signature at registration and the electronic signature at access are output along with the electronic data A. For example, when the document in 2001 is accessed, the electronic signature at registration P and the electronic signature at access P are output along with the electronic data A. When the document in 2002 is accessed, the electronic signature at registration P and the electronic signature at access Q are output along with the electronic data A. And when the document in 2003 is accessed, the electronic signature at registration P and the electronic signature at access R are output along with the electronic data A. Therefore a third party can perform a falsification check (validity check) using the valid signature key. Also falsification can be checked using the electronic signature at registration, and these falsification checks can be used depending on the case.

In this way, while the public key certificate normally has a period of validity of one year or so, the electronic signature at registration is always valid without risk of falsification even if data is stored over the long term. Here the public key certificate includes all the data which allows verification of the signature after the period of validity is expired. For example, the electronic signature, the public key certificate, the CA office certificate, the CRL (CA office expiration information), and the ARL (public key certificate expiration information) are included.

Other Embodiments

Figure 10:
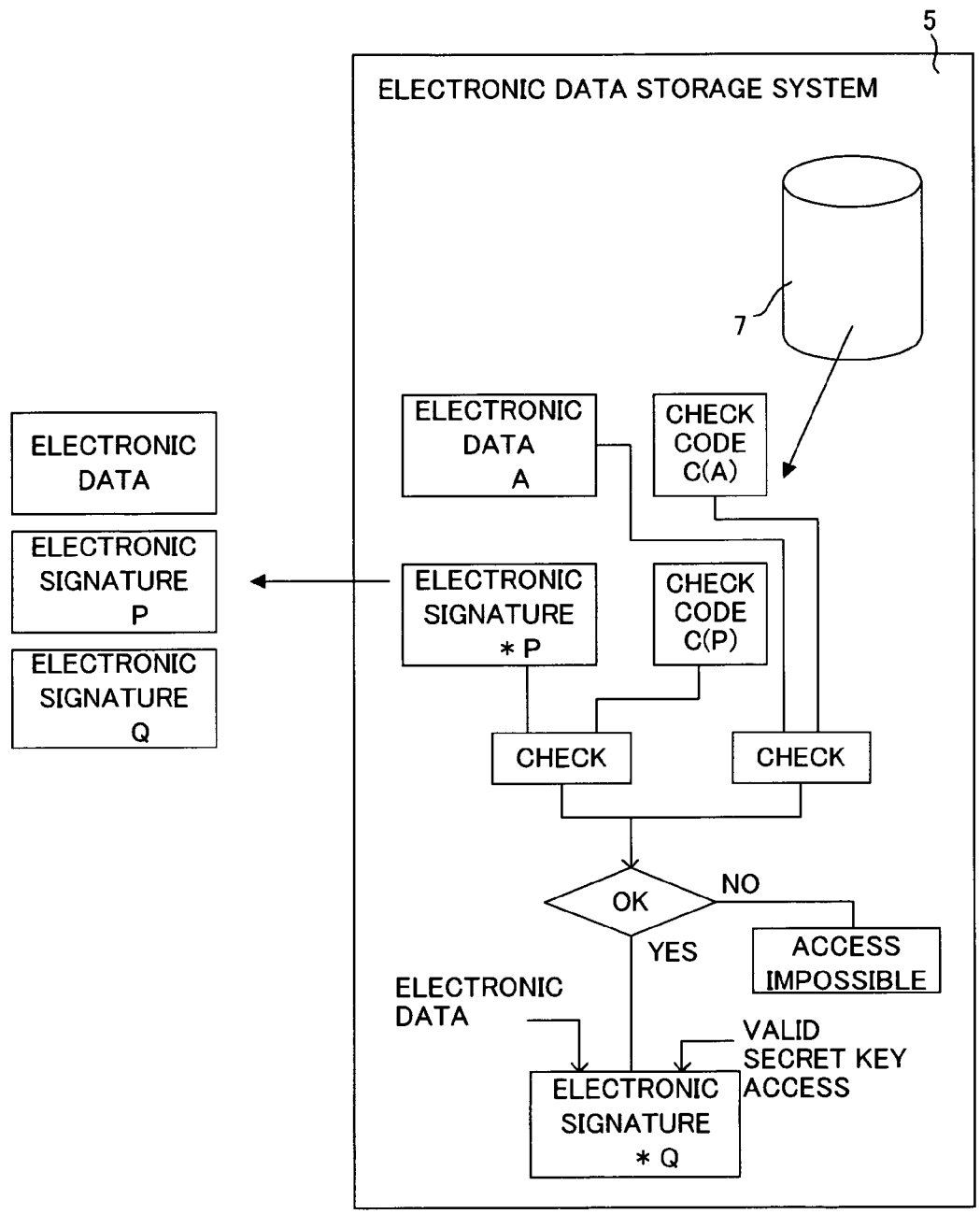
FIG. 10 is a diagram depicting another embodiment of the present invention.

FIG. 10 is a diagram depicting another embodiment of the present invention. In this embodiment, the hash value of the electronic signature at registration P is RSA-encrypted using a secret key of the public key certificate, which is valid at the time of access, in order to create the electronic signature at access Q.

Figure 7:
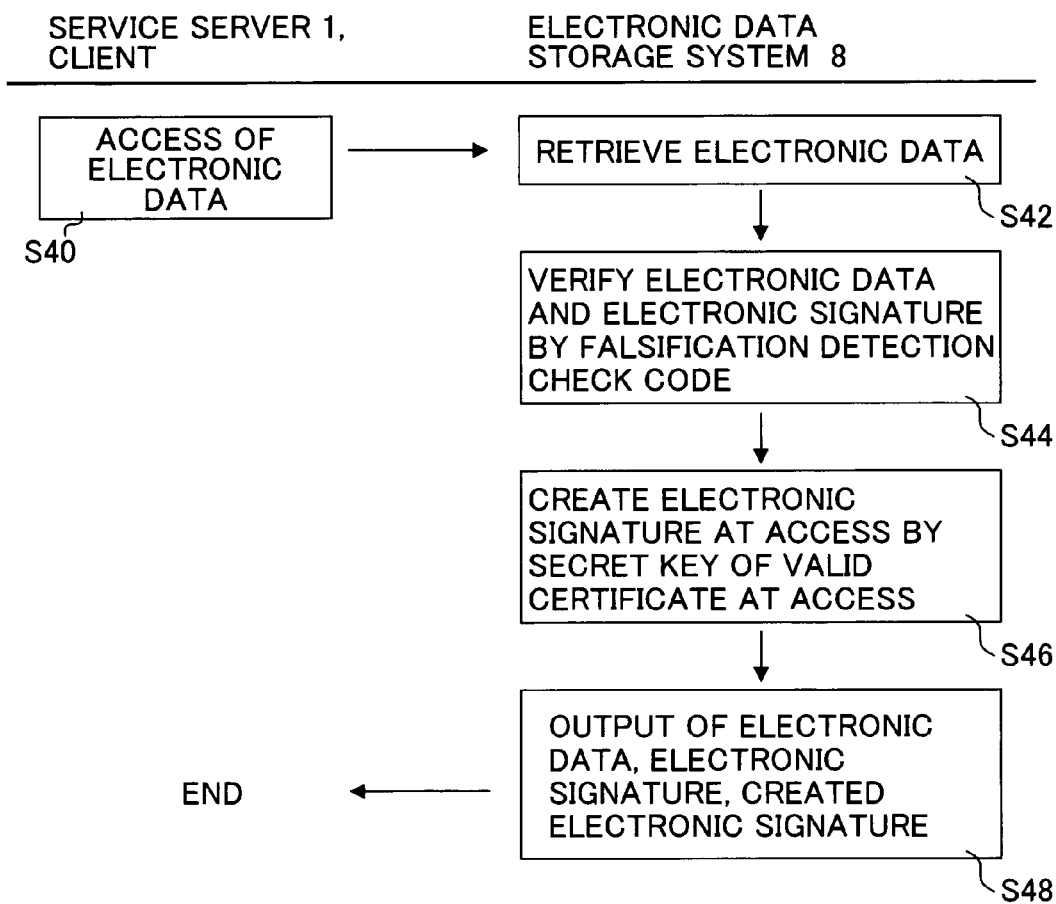
FIG. 7 is a flow chart depicting the document access processing in FIG. 1.
Figure 8:
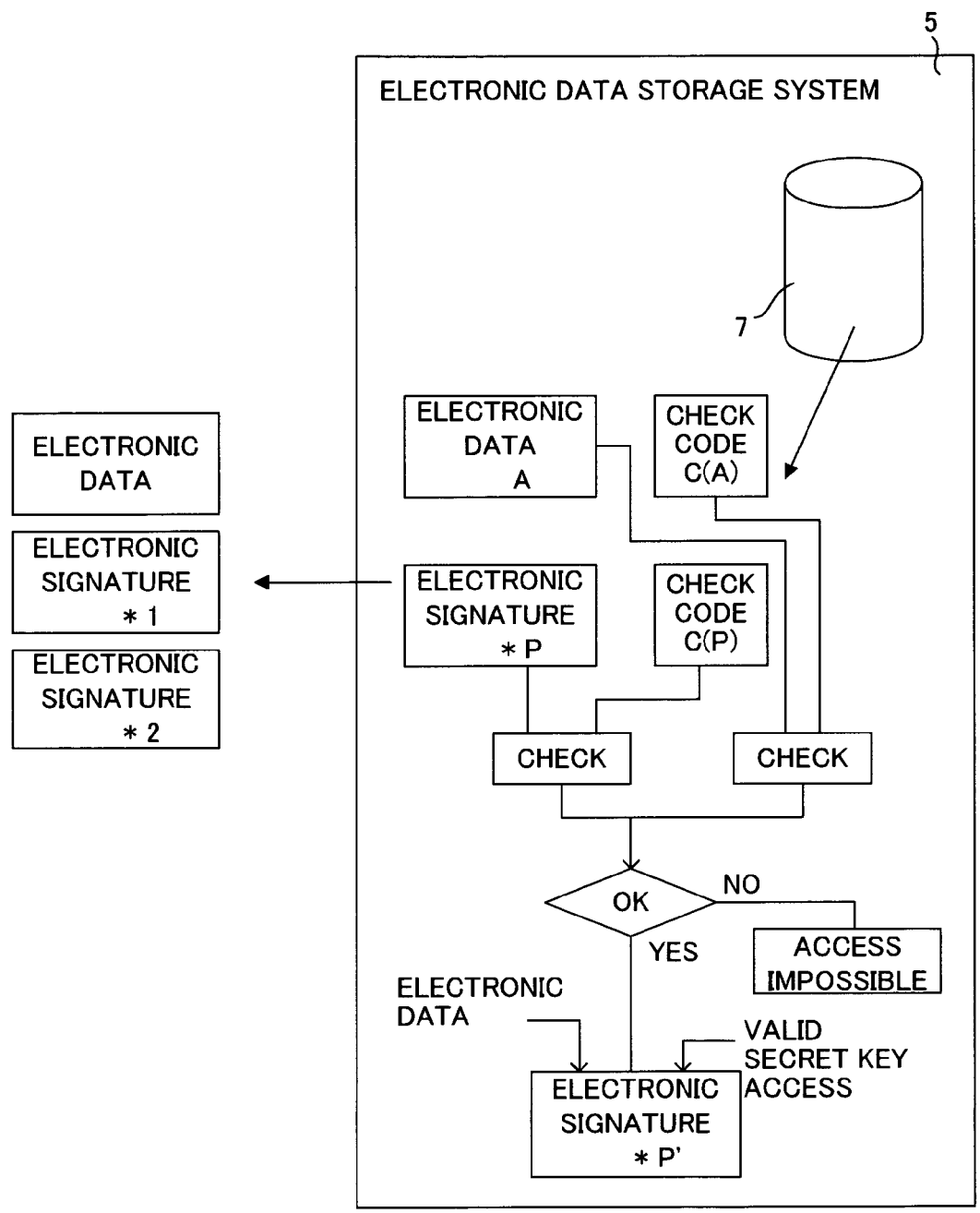
FIG. 8 is a diagram depicting the document access processing in FIG. 8.

In other words, according to the embodiment in FIG. 7 and FIG. 8, the electronic signature at access is created by encrypting the electronic data, but according to this embodiment, the electronic signature at access is created by encrypting the electronic signature at registration P.

Even after the period of validity of the public key certificate is expired, the validity of the electronic data and the electronic signature P is assured by the original check, and also a third party can verify the validity of the electronic data and the electronic signature at registration.

Figure 11:
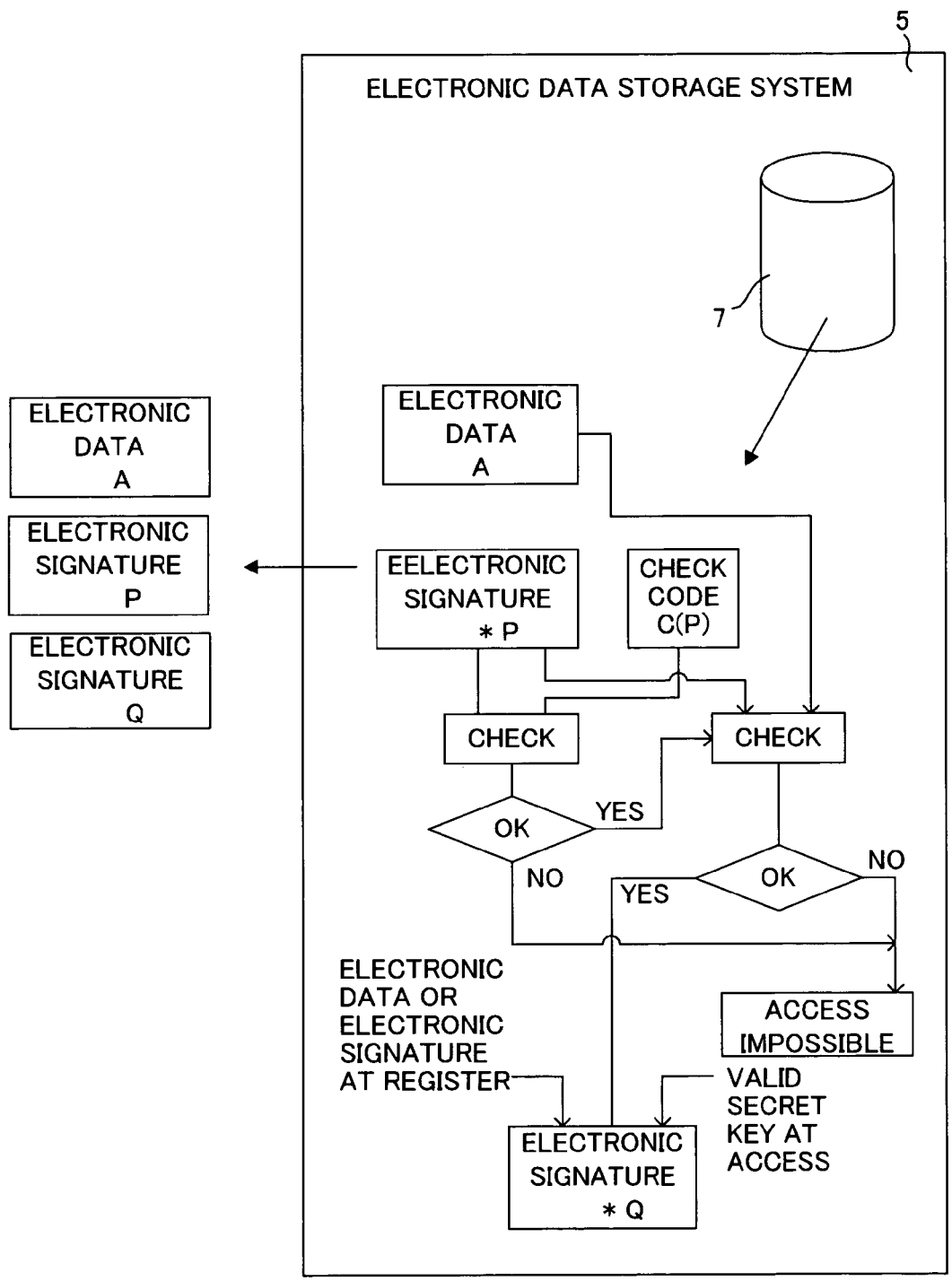
FIG. 11 is a diagram depicting the operation of still another embodiment of the present invention.
Figure 13:
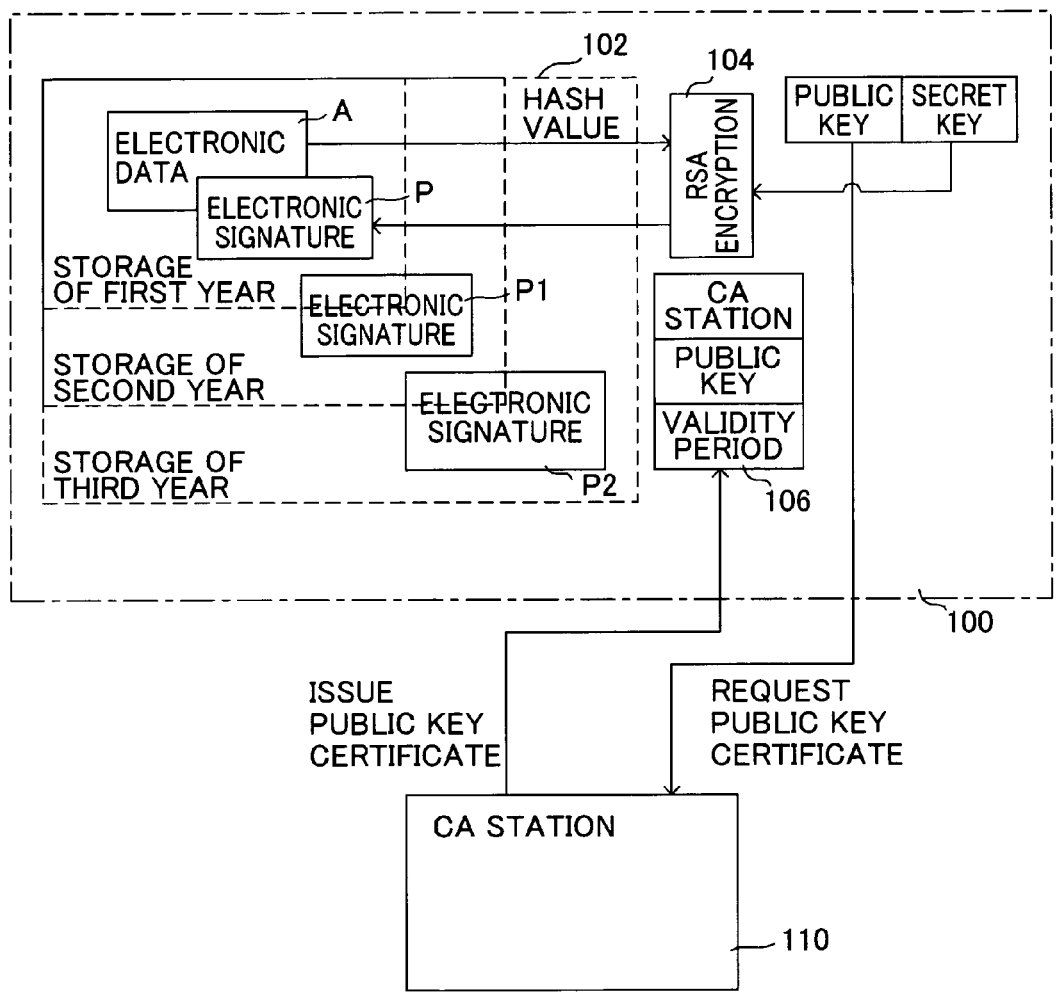
FIG. 13 is a diagram depicting a first prior art.
Figure 14:
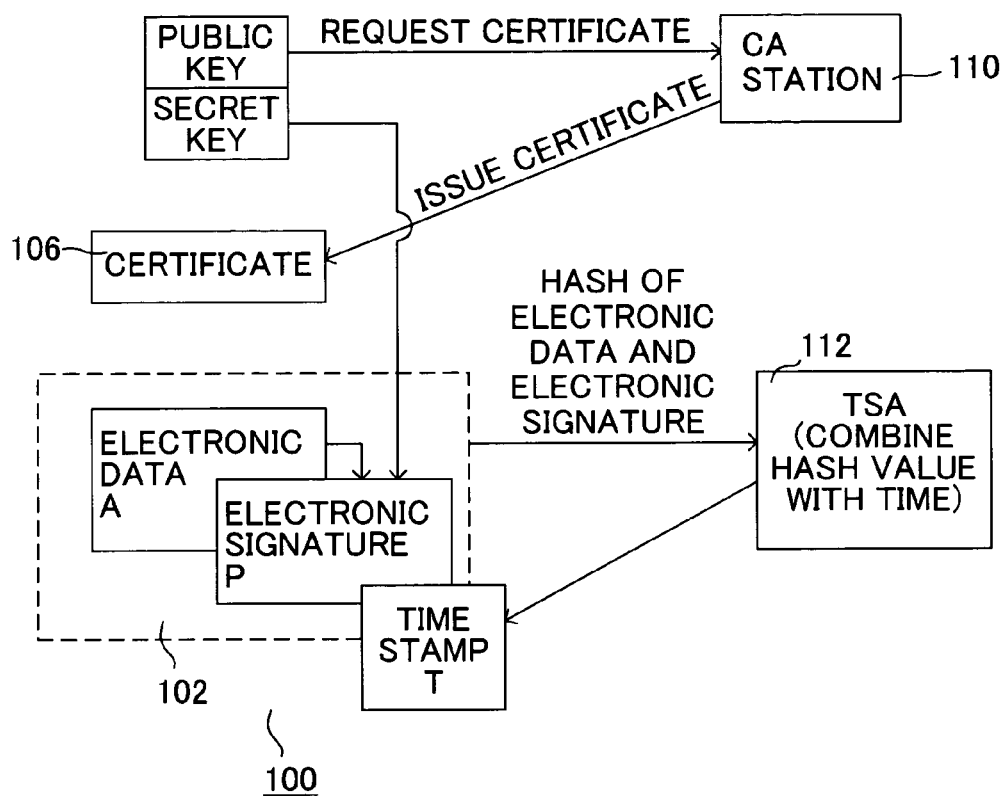
FIG. 14 is a diagram depicting a second prior art.

FIG. 11 and FIG. 12 are diagrams depicting still another embodiment of the present invention. In this embodiment, only the check code C (P) for the electronic signature at registration P is created when the electronic data A is registered, and the electronic data A, the electronic signature at registration P and the check code C (P) are stored.

At access, the validity of the electronic signature at registration P is verified using the check code C (P) attached to the electronic signature at registration P, then the validity of the electronic data A is checked using the electronic signature P. Then as the electronic signature at access Q, the electronic data or the hash value of the electronic signature at registration P is RSA-encrypted using a secret key of the public key certificate which is valid at the time of access, and the electronic signature at access Q is created.

In other words, according to the embodiment in FIG. 7 and FIG. 8, and the other embodiment in FIG. 10, the check code is created for the electronic data and the electronic signature at registration respectively at registration, but according to this embodiment, the check code at registration is implemented by one check code.

Therefore, even after the period of validity of the public key certificate is expired, the validity of the electronic data and the electronic signature P are assured by original checking, and a third party can verify the validity of the electronic data and the electronic signature at registration.

In the above mentioned embodiments, the electronic data storage system having the configuration shown in FIG. 1 was used for description, but the present invention can be applied to an electronic data storage system with other configurations. For the storage device, a magnetic disk, optical disk, magneto-optical disk and various storage devices can be used.

One CA office was used for description, but the public key certificate can also be acquired from a plurality of CA offices or from a plurality of hierarchical CA offices.

The present invention was described using the embodiments, but the present invention can be modified in various ways within the scope of the essential character of the present invention, which shall not be excluded from the scope of the present invention.

In this way, according to the present invention, a third party verification becomes possible by using a public key-based signature, and the electronic signature at registration does not face risk of falsification, and is always valid by providing a secret check code.

Also by attaching the electronic signature at access, the validity of the stored data is assured, and a third party can also verify the validity of the data.

Also by these features, third party verification becomes possible for over the long term. The present invention thus implements the long term storage of electronic data (the detection of falsification can be assured for a long period of time).

What is claimed is:

1. An electronic data storage system comprising:
a file device for storing at least electronic data; and
a data processing unit which generates a first check code for detecting falsification of said electronic data and a second check code for detecting falsification of a public key-based electronic signature using a secret encryption method and/or an encryption key when the electronic data is registered, stores said electronic data, said public key-based electronic signature, and said first and second check codes into said file device,
wherein said data processing unit generates said first check code by an encrypting method unique to said system from said electronic data, an electronic signature for registration by encrypting a hash value of said electronic data with a secret key, and said second check code by an encrypting method unique to said system from said electronic signature for registration, and
verifies the validity of said stored electronic data and said electronic signature by creating a third check code from said electronic data by said encrypting method unique to said system and a fourth check code from said electronic signature for registration by said encrypting method unique to said system, compares said stored first check code with said third check code and said stored second check code with said fourth check code, and outputs said electronic data, a second electronic signature created by encrypting said electronic data with a secret key which is valid at output time and said electronic signature for registration when said compared result is favorable.

2. An electronic data storage system comprising:
a file device for storing at least electronic data; and
a data processing unit which generates a check code for detecting falsification of a public key-based electronic signature using a secret encryption method and/or an encryption key when said electronic data is registered, stores said electronic data, said public key-based electronic signature and the falsification check code for said electronic signature into said file device, verifies the validity of said electronic signature using the check code attached to said electronic signature and verifies the validity of said electronic data using said electronic signature when said electronic data is output, and then accesses said electronic data and said electronic signature when said validity is confirmed,
wherein said data processing unit generates an electronic signature for registration by encrypting a hash value of said electronic data with a secret key and generates said check code by a method unique to said system from said electronic signature for registration, and wherein said data processing unit verifies the validity of said stored electronic data by creating a second check code from said electronic signature for registration by said method unique to said system, and comparing said stored check code with said second check code, and outputs said electronic data, a second electronic signature created by encrypting said electronic data with a secret key which is valid at output time and said electronic signature for registration when said compared result is favorable.

3. The electronic data storage system according to claim 1, wherein said data processing unit stores a certificate of the public key with which said electronic signature was created, simultaneously along with said electronic signature into said file device, when said electronic signature is created.

4. The electronic data storage system according to claim 3, wherein said data processing unit stores or outputs the expiration information of said public key certificate simultaneously.

5. The electronic data storage system according to claim 2, wherein said data processing unit stores a certificate of the public key with which said electronic signature is created, simultaneously along with said electronic signature into said file device, when said electronic signature is created.

6. The electronic data storage system according to claim 5, wherein said data processing unit stores or outputs the expiration information of said public key certificate simultaneously.

7. The electronic data storage system according to claim 1, wherein said data processing unit creates a pair of said public key and said secret key according to a request for key creation, issues a request of issuing a public key certificate to a CA office, acquires a public key certificate, and stores said acquired public key certificate in said file device.

8. An electronic data storage method, implemented in an electronic data storage system further comprising a file device for storing at least electronic data and a data processing unit; the method comprising:
a step of generating an electronic signature for registration by encrypting a hash value of electronic data with a secret key;
a step of generating a first check code for detecting falsification of electronic data and a second check code for detecting falsification of a public key-based electronic signature using a secret-encryption method and/or an encryption-key method, said second check code being generated from said electronic signature for registration, when said electronic data is registered;
a step of storing said electronic data, said public key-based electronic signature, and said first and second check codes into a file device;
a step of respectively verifying the validity of said stored electronic data and said electronic signature using said first and second check codes attached to said stored electronic data and said electronic signature when said electronic data is output from said file device; and
a step of accessing said electronic data and said electronic signature when said validity is confirmed,
wherein said generating step comprises a step of generating said first and second check codes by a method unique to said system,
and wherein said verifying step comprises:
a step of creating a third check code from said electronic data and a fourth check code from said electronic signature for registration by said method unique to said system; and
a step of comparing said stored first check code with said third check code and said stored second check code with said fourth check code,
and wherein said accessing step comprises a step of outputting to a different device said electronic data, second electronic signature created by encrypting said electronic data with a secret key which is valid at output time and said electronic signature for registration when said compared result is favorable.

9. An electronic data storage method, implemented in an electronic data storage system further comprising a file device for storing at least electronic data and a data processing unit; the method comprising:
a step of generating an electronic signature for registration by encrypting a hash value of electronic data with a secret key;
a step of generating a check code for detecting falsification of a public key-based electronic signature using a secret-encryption method and/or an encryption-key method, when said electronic data is registered;
a step of storing said electronic data, said public key-based electronic signature, and said falsification check code for said electronic signature into a file device; and
a step of verifying the validity of said electronic data using said electronic signature after verifying the validity of said electronic signature using the check code attached to said electronic signature when said electronic data is output from said file device, and then accessing said electronic data and said electronic signature when said validity is confirmed,
wherein said generating step comprises a step of generating said check code by a method unique to said system from said electronic signature for registration,
and wherein said verifying step comprises:
a step of creating a second check code from said electronic signature for registration by said method unique to said system; and
a step of comparing said stored check code with said second check code; and
a step of outputting to a different device said electronic data, second electronic signature created by encrypting said electronic data with a secret key which is valid at output time and said electronic signature for registration when said compared result is favorable.

10. The electronic data storage method according to claim 8, wherein said storage step comprises a step of storing a certificate of the public key with which said electronic signature was created, simultaneously along with said electronic signature into said file device, when said electronic signature is created.

11. The electronic data storage method according to claim 10, wherein said storage step comprises a step of storing a certificate of the public key with which said electronic signature was created, simultaneously along with said electronic signature, when said electronic signature is created.

12. The electronic data storage method according to claim 8, wherein said storage or output step comprises a step of storing or outputting the expiration information of a public key certificate simultaneously.

13. The electronic data storage method according to claim 8, further comprising:
   a step of creating a pair of said public key and said secret key according to a request for the key creation;
   a step of issuing a request of issuing a public key certificate to a CA office; and
   a step of acquiring said public key certificate, and storing said public key certificate in said file device.

14. The electronic data storage method according to claim 9, wherein said storage or output step comprise a step of storing or outputting the expiration information of a public key certificate simultaneously.

15. The electronic data storage method according to claim 9, further comprising:
   a step of creating a pair of said public key and said secret key according to a request for the key creation;
   a step of issuing the request of issuing a public key certificate to a CA office; and
   a step of acquiring said public key certificate, and storing said public key certificate in said file device.

* * * * *